Nov. 3, 1942.    W. D. HALL    2,300,418
CONTROL DEVICE
Filed Feb. 7, 1940    2 Sheets-Sheet 1
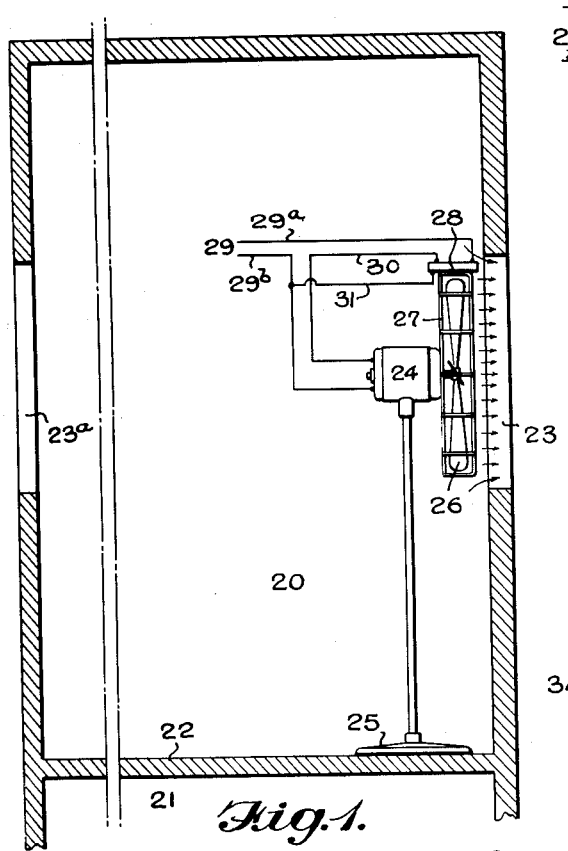
Fig. 1.
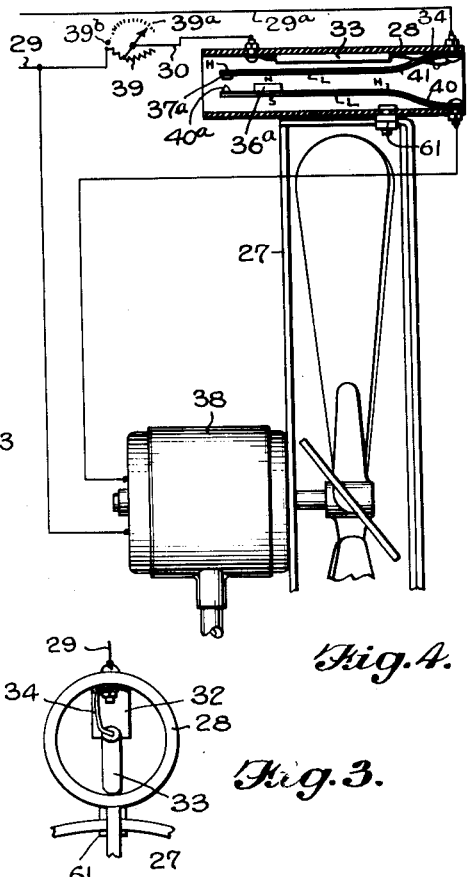
Fig. 4.
Fig. 3.
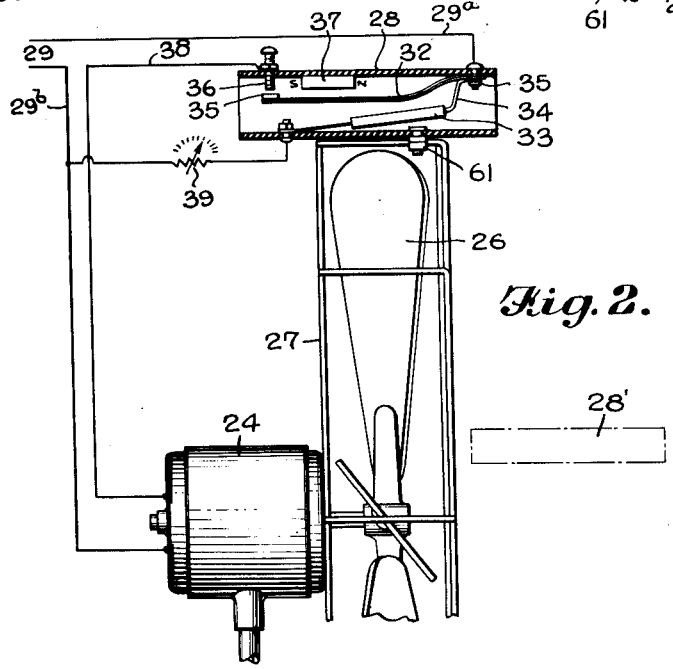
Fig. 2.
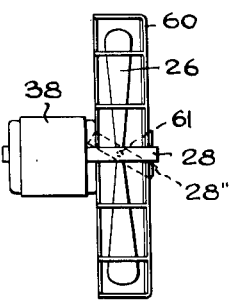
Fig. 5
Inventor
William D. Hall.

Nov. 3, 1942.  W. D. HALL  2,300,418
CONTROL DEVICE
Filed Feb. 7, 1940  2 Sheets-Sheet 2
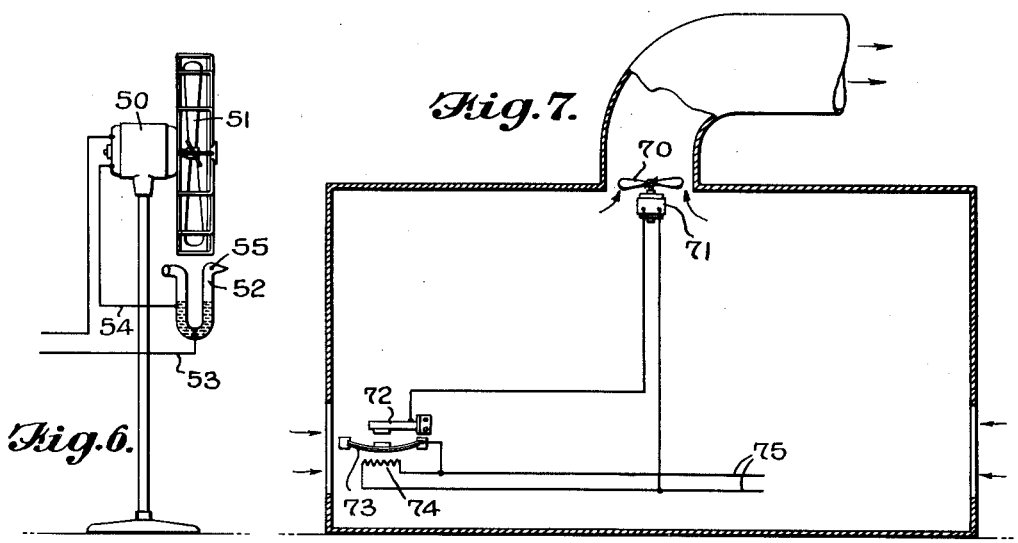
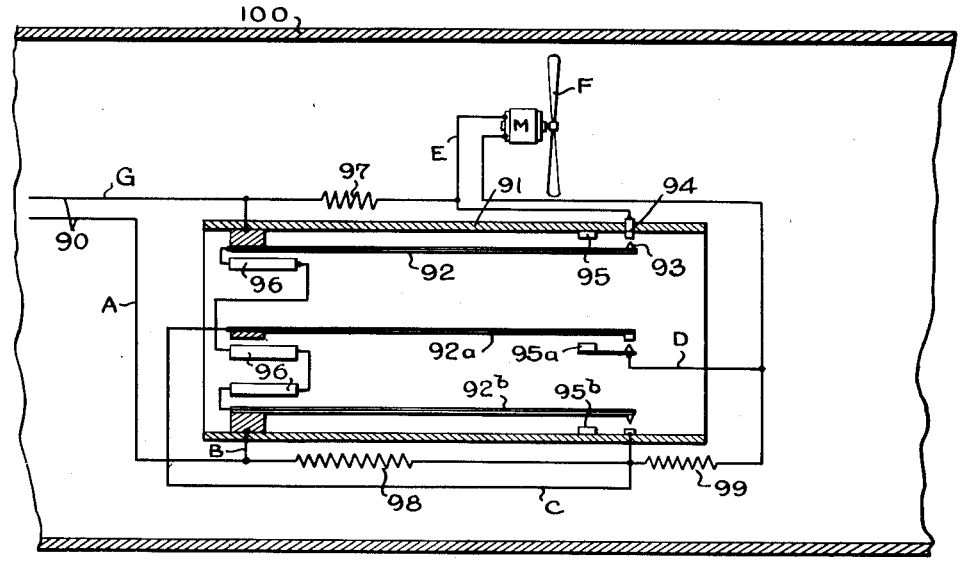
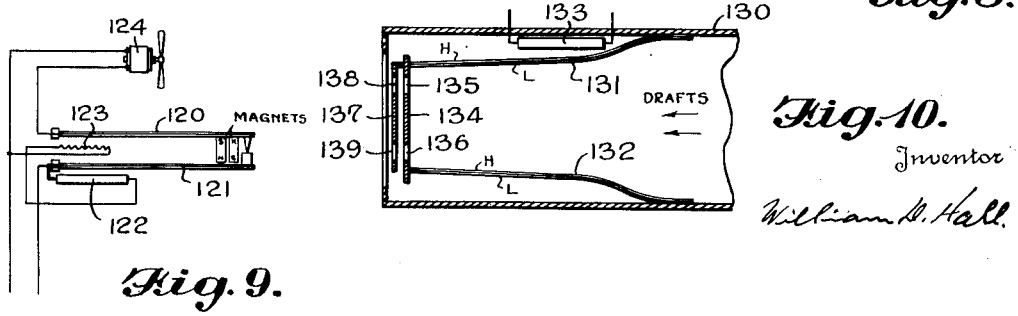

Patented Nov. 3, 1942

2,300,418

UNITED STATES PATENT OFFICE 2,300,418

CONTROL DEVICE

William D. Hall, Elkins, W. Va.

Application February 7, 1940, Serial No. 317,654

23 Claims. (Cl. 98—1)

(Granted under the act of March 3, 1883, as amended April 30, 1928; 370 O. G. 757)

This invention relates broadly to control devices and more specifically to means for controlling the fluid flow rate in a region. One object of the invention is to provide means which reduces the forced drafts in a region when the natural drafts in such region attain a predetermined velocity. Other objects of the invention will become apparent as this description proceeds.

This invention is of very broad scope and a number of modifications thereof are hereinafter disclosed. One form of the invention utilizes a fan and means responsive to both the velocity of and the temperature of any natural drafts passing said fan for controlling the operation of the fan. Another form of the invention is unaffected by ambient temperature changes and responds solely to the velocity of natural drafts to start a fan if the natural drafts have a velocity below a predetermined value and to stop the fan if the natural drafts have a velocity substantially above such predetermined velocity.

The preferred form of this invention utilizes parts combined as follows: (a) a fan having a motor for driving the same, (b) a draft-responsive element, and (c) a switch operated by the draft-responsive element for controlling the fan motor. Preferably the draft-responsive element is so located as to be affected only by natural drafts.

I have found that if the draft-responsive element is constructed according to the broader aspects of my prior Patent #2,225,941, granted December 24, 1940, on application Serial No. 58,122, filed January 8, 1936, entitled condition responsive device, certain results are achieved in the combination now being described which could not be achieved with other types of draft-responsive elements.

With the above and other objects and advantages in view, the invention consists of certain features of construction and operation of parts which will hereinafter be described and claimed, and in which—

Figure 1 illustrates a fragmentary sectional view of a room, for example an attic room, with the control device of my invention located therein.

Figure 2 shows a fragmentary view of a fan together with a draft-responsive element for controlling the same, the tube enclosing said element appearing in section while the element itself is shown in full view.

Figure 3 is a front view of the draft-responsive element and the tube enclosing same with the cooperating fan partly broken away.

Figure 4 is a fragmentary view similar to that of Figure 2 except that it illustrates a modified form of draft-responsive element. This form of element responds solely to the velocity of the drafts and is unaffected by ambient temperature changes.

Figure 5 is a top view of the invention and illustrates that the tube enclosing the draft-responsive element may be rotated to a plurality of angular positions with respect to the path of flow of any natural drafts passing the fan.

Figure 6 illustrates the novel claimed combination of a fan and a draft-responsive element for controlling the operation of the fan. This modification of the invention utilizes a different form of draft-responsive element than is shown in Figures 2 and 4.

Figure 7 is a fragmentary sectional view of an enclosure through which fluid circulates. Another modified form of my control device is mounted in this enclosure and regulates the fluid flow therethrough.

Figure 8 is a fragmentary sectional view of still another form of the invention. In this form, there are a plurality of draft-responsive elements each similar to the one of Figure 1 and which are adapted to maintain the total draft at a very constant value.

Figure 9 is a diagrammatic view of another form of the invention.

Figure 10 is a fragmentary sectional view illustrating application of the principles of this invention to ventilators.

The form of invention shown in Figure 2 has as its main use the control of draft in the top floor of a building. The top floor of a building, for example an attic, is subject to a higher temperature than other floors inasmuch as heat absorbed by the roof of the building reaches rooms on the top floor before reaching the other floors. It is well known that an attic may be as much as 40° F. hotter than other parts of a house. Even though the attic is unoccupied, this high temperature thereof is undesirable as it tends to raise the temperature of the rooms below somewhat. For example, the room 20 of Figure 1 is heated forty degrees above the outside ambient air temperature due to heat absorption of the roof. This high temperature of room 20 is conducted to some extent to the room 21 which is normally occupied. It causes say a five degree rise in temperature of room 21. Hence if the high temperature of room 20 can be prevented, the temperature of room 21 may be reduced somewhat. To prevent such temperature rise in room 20, the inventors of the prior art have proposed to locate a fan in room 20. This fan draws air from outside the building through the window 23a and exhausts the same from window 23. To insure that the room 20 is adequately ventilated, fan 26 ordinarily is operated continuously by the prior inventors. However, this is not necessary inasmuch as ordinarily the natural drafts in 20 will adequately cool the same. With my invention the fan 26 is operated only when necessary.

The specie disclosed in Figure 2 utilizes a fan 26 that is driven by a motor 24, protected by a guarding framework 27, and supported by a stand 25. As shown in Figure 1, this fan is adapted to create a forced draft out of window 23. This forced draft is illustrated by short arrows. Longer arrows at the edge of the window 23 show that certain natural drafts exist in addition to the forced draft. The tube 28 is mounted on the framework 27 in such a manner that the forced drafts do not flow therethrough but so that natural drafts may readily flow therethrough. This will be discussed in detail later. Located within tube 28 is a bimetallic strip 32. This strip is solely and rigidly supported at the right end thereof by a bolt 35 whereas the left end is relatively free to move according to the temperature of the strip. The left end of the strip 32 carries a contact point 35; and a complementary contact point 36 is rigidly supported by the insulating tube 28 which may be Bakelite. When there is no electromotive force impressed at 29, the contacts 35 and 36 are normally separated considerably for ordinary room temperatures. For example, in one actual device I so separate the contacts that they do not close until the average temperature of strip 32 is 110° F. The strip 32 has its high-expansive layer facing downwardly in order that the contacts move relatively toward each other when the strip is heated. An electrical resistor 33 is used. This resistor has as its primary function the changing of electrical energy from 29 to heat energy at 32. While this resistor may be arranged to supply heat to strip 32 solely by radiation, or solely by convection, or solely by conduction, or by any combination of these, I find it preferable for the transfer of heat to take place principally by conduction. So that this will be true I preferably employ a heavy short copper lead 34 from the resistor 33 to the strip 32. The resistor 33 may be well insulated so as to increase the heat flow through lead 34. I am not limited to heat flow by conduction, however, inasmuch as I may make a lead 34 rather small in order that the dissipation from 33 will be mainly convection. The resistor 33 provides a large temperature rise of strip 32, for example 35° F. The amount of temperature rise depends upon the velocity of the drafts flowing in tube 28. If there is no draft at all and if under these conditions the resistor 33 heats strip 32 by just 35° F., it is apparent that in event the room 20 is below 75° F., the contacts 35 and 36 will not close inasmuch as under the assumption previously made these do not close until strip 32 reaches 110° F. Hence, the fan 26 will never operate so long as the room is below 75° F. and this is desirable inasmuch as if the attic is no hotter than seventy-five no cooling thereof is necessary. If the attic temperature is say 85° F., the temperature of strip 32 will reach 120° F. in absence of any natural draft hence the contacts 35 and 36 will close and energize the fan motor 24. Should the natural drafts have appreciable velocity, they will carry heat away from strip 32 so that it is no longer heated by 35° above ambient but by only say 20° above ambient, hence the contacts 35 and 36 will open the circuit to the fan motor 24 (assuming a room temperature of 85° F.). If the attic is 85° F., a draft of such velocity as to cool the strip 32 from 35° above ambient to 25° above, is sufficient to ventilate the room. If the room 20 is well above 85° F., it is obvious that the fan should not be stopped unless the natural drafts are very strong. This result is inherent in my invention.

Temperature alone is not the best criterion for starting and stopping the fan for if the air outside the building is hot and if it is rapidly circulating through the building, nothing can be gained by operating the fan notwithstanding the fact that the attic is unduly warm. Since my device responds to both temperature and velocity, it is better than it would be if it operated only on temperature alone.

The principle whereby the heated bimetallic strip 32 is affected by the velocity of the drafts will now be stated. The strip 32 is always hotter than the air passing over the same. As has been stated, the heater 33 raises the temperature of strip 32 by as much as 35° above that of the ambient air. Air will absorb more heat from a heated body over which it passes if the air is moving rapidly than if it is moving slowly. Consequently, the amount of heat carried away from strip 32 depends on the speed of the natural drafts passing over this strip. The actual temperature of strip 32 depends on both the temperature of the drafts and upon their speed.

Frequently the drafts passing through a room such as 20, vary in velocity. So that sudden gusts and other velocity changes of short duration will not repeatedly start and stop the fan at a relatively high frequency of cycling, the time lag of response of the draft responsive element is made rather long. That is, the parts 32, 33, and 34 are constructed as to be rather massive and to have a large specific heat. For example, the following dimensions illustrate the minimum sizes which I consider to be massive. The bimetallic strip 32 may be 0.02 inch thick, the resistor 33 may be an ordinary tubular resistor such as is used in radio receivers and rated at one or two watts, and the lead 34 may be 0.05 inch in diameter. The mechanical dimensions of the parts are therefore radically different from those of my copending application S. N. 58,122, above-mentioned. For best results the strip 32 should be about three inches long and the resistor 33 should dissipate about 1.3 to 1.5 watts. A variable rheostat 39 may be employed although ordinarily this is omitted. If this resistor is adjusted, the operating characteristics of the draft responsive element are varied. Another method of varying the operating characteristics is illustrated in Figure 5. This figure shows that the tube 28 may be rotated about the pivot 61 to any angular position, for example to 28''. When thus rotated, a stronger natural draft is required to stop the fan, hence it is assured that very strong natural drafts must exist before the fan will be stopped automatically.

As stated above, the device of Figure 2 responds to both temperature and air velocity, which is very desirable for certain applications. There are other applications, however, where it is preferable that the device respond solely to the velocity of the drafts and be relatively unaffected by the temperature thereof. For these latter applications, the construction of Figure 4 may be used. Typical instances where a predetermined amount of ventilation is required irrespective of the ambient temperature are, hoods in chemical laboratories and plants, toilets, electroplating rooms, battery charging rooms, lecture halls, and so forth. In rooms such as those just mentioned it is undesirable to operate a fan continuously for if the forced ventilation plus natural ventilation is excessive an unduly heavy load is placed on the heating system of the building. To the end of saving electricity (at the fan itself) and saving on the cost of heating, my invention may be used. Two wires 29 of Figure 4 are adapted to be connected to a source of power. In a battery charging room these would be placed in parallel with the battery charger. In an electroplating room these wires would be in parallel with the motor which drives the low-voltage electroplating generator. The draft tube 28 would be located in the path of flow of the natural drafts. If the natural drafts flow directly past the fan such as they do in Figure 1, the tube 28 may be mounted on the guard 27. The fan 26, itself is arranged to force air into the room of the building, or to exhaust air therefrom.

In Figure 4, two parallel bimetallic strips are shown at 40 and 41. Both of these strips have their high expansive layers H facing upwardly and their low expansive layers L facing downwardly. Hence when the ambient temperature changes the strips move similar distances in the same direction and their complementary contacts 37a and 40a remain the same distance apart. When wires 29 are deenergized, the contacts 37a and 40a are normally spaced a considerable distance apart, as shown. However, wires 29 are normally continuously energized in which event the resistor 33 also is continuously energized by the following circuit, 29a, 34, 33, 30, 39, and 29. Heat from resistor 33 is conducted to bimetallic strip 41 by the massive copper lead 34. If there are no natural drafts to carry heat away from strip 41, this strip will be subjected to a large temperature rise causing it to flex downwardly and effect closure of contacts 37a and 40a. If the natural drafts within tube 28 have high velocity the drafts will carry heat away from strip 41 so rapidly that this strip cannot advance toward strip 40 sufficiently to close the contacts. Hence, the contacts 37a and 40a are closed when the natural drafts have low velocity and open when the natural drafts have high velocity. These contacts are in series with the fan motor 38. When they are closed the motor 38 is energized via the following circuit: 29a, 41, 37a, 40a, 40, 38, 29. When these contacts are open, the fan motor 38 is deenergized. It is therefore evident that the fan motor 38 runs whenever the natural drafts have low velocity and is stopped whenever the natural drafts have high velocity. Due to the fact that parts 32, 33, and 34 are massive, the fan is not repeatedly turned on and off in response to fast cyclic variations of the natural drafts.

The device of Figure 4 may be placed in front of the draft door of a furnace in which event it will supply forced draft to the furnace in event natural drafts thereto are of only low velocity. Moreover, this device may be placed in the stack of a furnace provided care is taken that it is far enough from the flame that it will not be destroyed.

For applications, such as draft control to a furnace, it may be desirable to make bimetallic strip 40 of a material having a higher deflectivity than that of the bimetallic strip 41. This may be readily done by using a brass layer H and an Invar layer L, both of equal thickness at 41, but with the Invar layer thicker than the brass layer of strip 40.

When strip 41 has a greater deflectivity than the strip 40, the contacts 37a and 40a will open when the temperature is high, even though the drafts are low. In draft control for furnaces this is of advantage since it automatically stops all forced drafts whenever the ambient temperature is excessive. A high ambient temperature may means that the furnace is overheating.

A rheostat 39 is in series with the resistor 33. This rheostat has a graduated scale 39a calibrated in values of air velocity. It may be adjusted to vary the velocity required to cause the contacts 37a and 40a to open. If it is rotated to its position of minimum resistance the contacts will remain closed unless a strong draft exists. When 39a is rotated to its position of maximum resistance only a small natural draft flow through tube 28 is necessary to stop the fan. If rotated to an "off" position 39b, the resistor 33 will cool and the fan 38 will remain off.

In general, it is desirable to provide a "differential" of operation for the devices of Figures 2 and 4. By this, I mean that the natural draft required to stop the fan once it has been started should be somewhat greater than the maximum draft below which the fan will start once it has been stopped. For example, if the fan is running, it requires a draft velocity of say three feet per second in tube 28 to stop the fan. Once three feet per second has been attained and the fan stopped, it will not restart until the natural drafts fall to an average value as low as one and one-half feet per second. When the natural drafts fall below one and one-half feet per second the fan will again be started and will continue to run until the drafts in tube 28 rise again to three feet per second. This differential of operation insures stable operation of the fan and prevents the motor from being started and stopped too frequently which obviously is a good feature. A magnet such as 36a or 37 will create such a differential.

All bimetallic strips of commercial importance will be attracted by a magnet. I contemplate using a bimetallic strip at 32 which is strongly attracted by a magnet, for example the magnet 37. The screw 36 is adjusted so that when contacts 35 and 36 are closed, the strip 32 is rather close to the magnet 37. When the strip 32 is cooled, the magnet tends to hold the contacts closed and before they become separated the strip 32 must be cooled to a temperature well below the temperature it attained when it closed the contacts 35 and 36. Hence, similarly the natural drafts required to open the contacts must be considerably stronger than the drafts which existed when the contacts closed. In Figure 4, a magnet 36a is mounted upon and rigidly fastened to the strip 40. This magnet has a north pole N facing the strip 41 and a south pole S adjacent the strip 40. The magnet sets up lines of force which cross the short gap above the magnet, enter strip 41, and return to strip 40 throughout the long parallel strip portions of 40 and 41. This feature of providing a long parallel pair of strips with a magnet mounted between them is believed to be new in the art of thermostatic switches. When strip 41 is heated it approaches the strip 40 until finally it reaches a point from which it snaps to a contact-closed position. Before the contacts will again open, strip 41 must be cooled well below the temperature at which it snapped to contact-closed position. Hence a differential of operation of the device exists and prevents the fan from being started and stopped too frequently.

In addition to the differential of operation provided by the magnet 37, I have additional means which effects a differential of operation. I may construct strip 32 of a bimetal having a high specific resistivity. In this event, the current to the fan motor will generate heat in the strip 32 while flowing therethrough. This heat is generated only when the fan motor is running. Hence, when the fan motor runs, more heat is supplied to 32 than when the motor is stopped, accordingly more air flow is required to cool the strip to a predetermined temperature when the fan motor is running than when it is stopped. Therefore the air flow required to stop the fan is greater than that required to maintain it stopped, once stopped, and a differential of operation exists.

If the fan 26 is of relatively small capacity, the air flow in tube 28 will not be greatly affected by the operation of the fan but will be truly indicative of the actual natural drafts of the room. I contemplate using my invention on fans of this size. Such fans draw only a small current which does not appreciably heat strip 32 when flowing therethrough. I also contemplate using the same device, or others built on identical design, on fans of large capacity. With these fans a considerable draft is induced in tube 28 due to operation of the fan itself and would create an erroneous operation except for the fact I have provided a large differential of operation. A fan of large capacity draws a large current which heats strip 32 and compensates for the excessive cooling thereof which is caused by induced stray drafts. Hence, it is obvious that a large differential will offset the effect of induced drafts.

In Figure 4, the motor current passes through both of the bimetallic strips, however if strip 41 has a higher specific resistivity than strip 40 a differential of operation will be created due to the heating of 41 when the fan is running. Any large manufacturer of thermostatic bimetal can supply strips having similar deflectivities but radically different resistivities. In practice, strip 40 may be a bimetallic strip comprising a brass layer H and an Invar layer L. This combination has a relatively low specific resistivity. The strip 41 may be matched as to deflectivity and be of a nickle-chrome steel layer H and an Invar layer L such a strip having high resistivity.

Ordinarily I contemplate placing the tube 28 outside the direct air flow path of the fan. However, if the operating differential is high enough, the tube 28 may be placed directly in the path of air for example at 28' of Figure 2. If the operating differential, that is, the difference expressed in feet per second between the velocity in tube 28' at which the switch opens and the velocity at which it closes, is equal to or greater than the velocity of the air set up by the fan itself the operation of the device with the tube at 28' will be satisfactory. However, I recommend placing the tube outside the direct path of air flow of the fan as it then operates in a greatly superior manner as compared with the operation at 28'.

Figures 1 to 5 inclusive show certain rather specific applications of my invention. However, in view of the state of the art, some rather broad aspects exists which are not limited to any particular type of draft responsive element. In Figure 6 is shown a motor 50, a fan 51, and a draft responsive means at 52. A glass tube 52 is curved to the shape shown and has its left end open. Its right end is sealed, except for a small pin hole 55. A light liquid, for example water with an electrolyte therein to create conductivity, is located in the tube 52. Wires 53 and 54 project inside the tube and contact the electrolyte when the latter attains the same height in both legs of the tube. When no natural drafts exist the electrolyte remains level and the fan motor 50 is energized. However, should a strong draft exist it will create a pressure in the left leg of the tube causing the liquid to descend therein and rise in the right leg. This will break the circuit to the motor 50. The small hole 55 permits only a damped motion of the liquid and therefore insures a long time lag of response to the device.

In Figure 7, a housing permits circulation of a fluid, for example air, in a passageway at the bottom and out a tube at the top. To insure that there is always an adequate circulation, a fan 70, driven by a motor 71 is provided. A Spencer type snap-acting bimetallic plate or disc 73 is located in the path of air flow. When cool, disc 73 is out of contact with 72. A heater 74 is energized by 75. In absence of any natural circulation, the heat supplied from 74 to 73 will cause the disc to snap closed and start the motor 71. A differential of operation is provided inasmuch as the Spencer type discs snap open at a lower temperature than that at which they snap closed. If a large natural circulation exists, the heater 74 will be cooled thereby permitting the switch 73 to snap open. In this device, the heater is composed of fine wire in the air stream and supplies heat to 73 almost solely by convection. This creates a very sensitive device.

In Figure 8, a fan F, driven by a motor M is arranged to maintain a constant velocity of air flow in a pipe 100. Three bimetallic strips 92, 92a, and 92b are all rigidly supported at their left ends. Each has a heater 96 associated with it, the three heaters 96 being in series with each other and all constantly energized by the line 90. Each strip has a stationary contact such as 94 cooperating therewith, and magnets such as 95, 95a, and 95b cooperating therewith. All three strips deflect to contact-closed position whenever heated sufficiently, however they close their contacts at different temperatures. Strip 92 is constructed to operate at the higher temperature so that it will open its contacts when the velocity of air is low. Strip 92a operates at a medium temperature and opens its contacts in response to a medium air velocity. Strip 92b closes its contacts in response to a low temperature and will therefore break its circuit only in response to high air velocities. All three heaters 96 are identical and affect their respective strips to the same degree. To summarize what has just been said, it is noted that there are three air-responsive switches which open their circuits at three different velocities. Strip 92 opens in response to low velocities, 92a in response to medium velocities and 92b only in response to high velocities. If there is no natural air flow in tube 100, all three switches will be closed. The fan will be energized via the following current path: A, B, 92b, C, 92a, D, M, E, 94, 93, 92', G. The fan motor M will therefore run without any impedance in its energizing circuit. If there is a small natural circulation the fan does not need to be fully energized and in this case switch 92 opens and places resistor 97 in series with the energizing circuit. If the natural drafts have a medium velocity, the fan need only run at a medium speed. In this event, switch 92a opens placing resistor 98 in series with the fan motor. The energizing circuit then consists: A, B, 92b, 99, M, 97, G. If the natural drafts have high velocity, resistor 98 is also in the fan motor circuit inasmuch as switch 92b breaks its contacts. The fan is then energized by the following circuit: A, 98, 99, M, 97, G. This allows the fan to operate only slowly. In each case, the total air flow in the tube remains substantially constant for the forced drafts are decreased when the natural drafts are increased. In Figure 8 it is assumed that the pipe 100 has a very large cross-section, much larger in relation to the tube 91 and the fan F than is shown.

In Figure 9, the two bimetallic strips 120 and 121 are supported at their left ends and carry complementary contacts at their right ends. The contacts are initially closed when both strips are at the same temperature. When strip 121 is heated it tends to deflect downwardly, in other words away from 120. When strip 120 is heated it too deflects downwardly or toward 121. These two strips are both located near a fan 124 but outside the path of air flow of the fan. These strips and their respective heaters 122 and 123 are located in the path of any natural drafts. When no natural drafts exist, the heaters 122 and 123 respectively heat 121 and 120 by the same amount. Both strips 120 and 121 therefore deflect downwardly the same amount and the contacts remain closed thus energizing the fan 124. However, the method of supplying heat to the strips is different. Heater 122 supplies heat to strip 121 by conduction. Heater 123 supplies the same amount of heat to strip 120, in absence of natural drafts, but by convection. To do this, heater 123 gives off more heat than 122 but the same amount of heat reaches the respective strips in both cases in event no natural drafts exist. However, if a natural draft exists, the fine heating wire 123 is cooled thereby much more easily than is the massive heater 122, hence practically none of the energy supplied to 123 is converted to heat at 120 yet a considerable amount of the energy supplied to 122 goes into heating 121. Hence, strip 121 moves downwardly more than does 120 thereby separating the contacts and stopping the fan. If the natural drafts should subsequently fall off, the heat at 123 would again flow to 120 causing the latter to deflect downwardly and close the motor circuit to start the fan.

In Figure 10 is shown a duct 130 with two bimetallic strips 131 and 132 supported therein at their right ends. A heater 133 is continuously energized and in absence of any natural drafts heats strip 131, but not 132. When heated in absence of any natural drafts, strip 131 deflects to the position shown. In this position, the holes 135 and 136 in plate 134 are in line with holes 138 and 139 of plate 137. Plates 134 and 137 are respectively carried by strips 132 and 131. Strip 131 does not touch plate 134 but passes behind the same. If the natural drafts are strong, they will carry heat away from 133 causing 131 to deflect upwardly. This will move the holes 138/139 out of line with their complementary holes 135/136 thus cutting down the output of air which may flow from the duct or ventilator 130. A device constructed in the manner shown will effect a relatively constant output of air from 130 irrespective of the air input. In response to ambient temperature changes, both strips 131 and 132 will move similarly and the relationships of holes 135, 136, 138 and 139 will not change.

The broader aspects of this invention are not limited to any specific type of fluid pump, to any particular fluid-speed responsive element, nor to any specific relationships thereof inasmuch as this new broad combination will suggest many applications of the new principle to numerous branches of industry. Therefore, the broader claims are to be limited only by the prior art and a fair interpretation of their scope.

I claim to have invented:

1. The combination with a fan which is adapted to be placed in a region subject to varying natural drafts, of a motor for driving said fan, a thermostatic element comprising a bimetallic strip having a thickness at least 0.02 inches, a massive electrical heater, wires adapted to be connected to a source of electrical supply, said wires including means connecting said electrical heater in parallel with such source and also including a massive metallic heat conductor for transferring heat from said heater to said bimetallic strip, and means connected to said motor and associated with and controlled by deflection of said bimetallic strip for energizing said motor when said bimetallic strip is heated and for maintaining said motor deenergized when said bimetallic strip is cooled; said bimetallic strip being positioned in the path of flow of said natural drafts so that the amount of heating thereof effected by said heater will depend on the velocity of said natural drafts.

2. The combination with a fan which is adapted to be placed in a region subject to varying natural drafts, of a motor for driving said fan, whereby said fan sets up forced drafts when the fan is driven by said motor, a thermostatic element, means supporting said thermostatic element in the path of flow of said natural drafts and outside the path of flow of said forced drafts, means adapted to continuously heat said element above ambient temperature, and means responsive to said element for starting said motor when said element is heated and stopping the same when said element is cooled.

3. A system for preventing undue temperature rise of a building comprising means adapted to be placed in a building for cooling such a building by exchanging air between the inside and outside of the building, said means consisting of a fan and a motor for driving said fan, and a thermostat adjacent said fan and responsive to the temperature of air at said fan for deenergizing said motor when the temperature of such air is below a predetermined value, said fan and thermostat being positioned in sufficiently close operative relation so operation of said fan effectuates increased air flow across said thermostat.

4. The combination with a fan adapted to be placed in a region subject to varying natural drafts; of a motor for driving said fan whereby said fan creates forced drafts; a circuit for energizing and deenergizing said motor; contacts in series with said circuit; means, comprising a bimetallic strip, for causing said contacts to snap closed when said strip is heated to a high temperature and for causing said contacts to snap open only when said strip is then cooled to a lower temperature, whereby a differential of operation exists; a heater in heat transfer relation with said strip and means supporting said strip and heater in the path of said natural drafts and outside the path of flow of said forced drafts whereby the amount of rise above ambient temperature of the natural or forced drafts which said strip attains due to heating by said heater depends on the velocity of said natural drafts to an appreciable degree.

5. A ventilating device comprising a fan blade having a hub portion and a tip outer edge, a shaft connected to said hub portion, a motor for driving said shaft, a protective guard positioned about said fan blade, said guard including a portion concentric with said shaft and at a distance from said shaft further than the distance from said shaft to said tip edge of said fan blade, a tube defining an elongated passageway therethrough, means fastened to said portion of said guard and supporting said tube to position said passageway normally parallel to the axis of said shaft and at a point further from said shaft than the position of said tip edge of said fan blade, said means including rotatable means which is operable to rotate said tube about an axis that is perpendicular to the axis of said shaft, a bimetallic strip within said tube, said strip having a thickness no less than 0.02" thick, means supporting one end of said strip and fastening such end rigidly to said tube, means comprising a massive electrical heating resistor located within said tube, means for continuously energizing said resistor and including massive metallic heat conducting means for conducting heat from said resistor to said strip, contacts in series with said motor and moved to closed position when said strip is above a predetermined temperature and to open position when said strip is below a lower predetermined temperature, and means whereby said contacts open and close with a snap action.

6. The combination with a fan adapted to be placed in a region subject to natural drafts, of means whereby said fan sets up forced drafts comprising a motor for driving said fan, a circuit for energizing said motor; draft-responsive means comprising a thermostatic element and heating means that heats said thermostatic element continuously, said draft-responsive means being connected to said circuit and so constructed and arranged that said thermostatic element is heated by heat generated due to current flow through said circuit, whereby a differential of operation of said draft-responsive means exists, means supporting the draft-responsive means in the path of flow of said natural drafts and such that it will be affected primarily thereby, said circuit including therein means controlled by said draft-responsive means for stopping said motor when said natural drafts have high velocity and for energizing said motor when said natural drafts have low velocity.

7. The combination with a fan adapted to be placed in a region subject to varying natural drafts, of means whereby said fan sets up forced drafts within a restricted portion of said region comprising a motor, whereby a second portion of said region exists where the fluid flow therethrough is primarily natural drafts, a thermostat including means for energizing said motor when said thermostat is hot and for deenergizing said motor when said thermostat is cool, and means positioned in said second portion of said region for supplying heat to said thermostat, whereby the amount of heating of said thermostat depends on the velocity of said natural drafts.

8. The combination with a fan, of a shaft therefor, a motor for rotating said shaft, a tube having openings respectively at opposite ends thereof which openings are positioned near said fan and both at a distance from the axis of said shaft greater than the radius of said fan, and draft-responsive means within said tube for controlling the energization of said motor.

9. The combination with a fan adapted to be placed in a region subject to natural drafts, of means whereby said fan sets up forced drafts in said region comprising a motor for driving said fan, a tube defining an elongated passageway therethrough, means supporting said tube in the path of flow of said natural drafts and such that the drafts flowing through said tube are primarily natural drafts, such supporting means including means operable to vary the angle between the passageway and the path of flow of said natural drafts, and means in said passageway for controlling the operation of said motor in accordance with the flow of drafts through said passageway.

10. The combination with a fan adapted to be placed in a region subject to varying natural drafts, of a motor for operating said fan, contacts in series with said motor, thermostatic means having first and second heat-sensitive sections thereof and including means for closing said contacts when the first of said sections becomes a predetermined amount hotter than the second section and for opening said contacts when said sections have temperatures both near to the ambient temperature, means supplying heat to said first section, and means supporting said first section in the path of flow of said natural drafts so that the temperature rise thereof effected by said heating means will depend on the velocity of said natural drafts.

11. A control device which is responsive primarily to the speed of a moving fluid for closing a circuit when the fluid velocity is low comprising in combination with the circuit to be controlled, of electrical means for controlling said circuit comprising a thermal element for closing said circuit when the element is heated in a predetermined manner and for opening said circuit when the element is cooled in a predetermined manner, massive means for generating heat and for conducting such heat to said thermal element, whereby the temperature of said thermal element is raised above ambient, and means supporting said thermal element to position the same in the path of flow of moving fluid and to position the same such that when the velocity of such moving fluid is low that said element will be heated by said massive means in said predetermined manner to effect closure of said circuit and when the velocity of such moving fluid is high that the said element will be cooled in said predetermined manner by the flow of fluid across the same to open said circuit.

12. A thermostatic fluid speed responsive switch comprising a pair of bimetallic strips exposed in the path of fluid flow to which response is desired, means supporting one end of each strip such that the other ends of said strips are free to move in the same direction with respect to each other in response to ambient temperature changes, complementary contacts mounted on said free ends of said strips, means including a magnet carried by one strip near the free end thereof for causing snap action of said switch, and means for heating one of said strips more than the other.

13. The combination with means for varying the ventilation of a region, of means including a thermal element for controlling the first-named means to increase the amount of ventilation effected thereby when said element is heated and for decreasing the ventilation effected thereby when said element is cooled, heating means for raising the temperature of said thermal element appreciably above ambient, and means positioning said element in the path of flow of ventilation of said region, whereby the extent of rise in temperature of said element above ambient depends on the amount of ventilation of said region.

14. The combination with means for creating forced drafts, of means relatively unaffected by the velocity of said forced drafts and primarily responsive to conditions of natural drafts for rendering said first-named means inoperative in response to predetermined natural draft conditions the second-named means being located near to the first-named means and including a baffle means located between the first and the second-named means to reduce the effect of the first-named means on the second-named means.

15. The combination with ventilation producing means, of draft-responsive means for reducing the output of said ventilation producing means in response to predetermined draft velocities, the draft-responsive means including means to give the same a long time lag of response whereby it operates according to the average of rapid cyclic variations of draft, and means supporting the draft-responsive means in a position whereby the same operates independently of the ventilation producing means and relatively unaffected thereby.

16. The combination with a fluid pump; of means supporting said pump to position the same in a region subject to forces, additional to those of said pump, which tend to effect fluid motion in said region; and means relatively unaffected by operation of said pump and primarily responsive to the magnitude of said forces for controlling the operation of said pump.

17. The combination with a fluid pump adapted to be placed in a region to affect fluid flow therein; of a motor for driving said pump; thermostatic means in, subject to, and operated by temperature changes of said region for controlling the energization of said motor; and means in the path of, and subject to the velocity of, fluid motion of said region for modifying the action of said thermostat by raising the temperature thereof above ambient to a degree depending on the velocity of said fluid motion, whereby the control of said motor as affected by said thermostatic means depends upon both the temperature of and velocity of the fluid.

18. The combination with a fan adapted to be placed in a region subject to fluid motion additional to that set up by said fan, of a motor for driving said fan, a circuit controlling said motor, draft-responsive means associated with and controlling said circuit to deenergize said motor when the said fluid motion that is additional to that set up by said fan has high velocity and to energize said motor when said fluid motion that is additional to that set up by said fan has low velocity, means so supporting said draft-responsive means in said region that the same is subject to drafts set up due to said fan and also subject to that component of fluid motion that is additional to that set up by said fan, said draft-responsive means including means to give the same such a wide differential of operation that the difference value between the velocity of fluid motion across the draft-responsive means at which the draft-responsive means stops the fan and the lesser velocity of fluid motion across the same at which the draft-responsive means starts the fan is greater than the velocity value of said fluid motion across the draft-responsive means due to operation of the fan.

19. In combination with a fan adapted to be placed in a region subject to varying natural drafts, of a motor for driving said fan at such a speed that the fan sets up forced drafts of relatively high velocity within a restricted portion of said region, and draft-responsive means operable to reduce the degree of energization of said motor in response to a flow of drafts across the draft-responsive means at a velocity less than the speed of said forced drafts and for subsequently increasing the degree of energization of said motor when the velocity of the drafts across the draft-responsive means falls to a value lower than that at which the energization was decreased, and means supporting said draft-responsive means in the path of flow of said natural drafts and outside the direct path of flow of said forced drafts, whereby the speed of the fan is reduced by natural drafts of lower velocity than the velocity of the forced drafts and restarted when the natural drafts fall to a value lower than that at which the fan speed was reduced.

20. In a switch primarily responsive to changes in fluid velocity and designed and adapted to control a circuit when the rate of fluid velocity changes a small amount, the combination with a thermal element, of means associated with and operated by said thermal element for controlling said circuit, massive means for generating heat and for transferring such heat to said thermal element primarily by conduction in such degree that in absence of any said fluid motion the temperature of said thermal element is raised highly above ambient, and means supporting the thermal element in the path of flow of the said fluid so that heat will be carried away from the same to an extent depending on the fluid velocity and thereby determine the extent of rise above ambient temperature attained by said thermal element.

21. In an air-responsive switch, a pair of expansible and contractible members which change their dimensions when their temperature change, means for controlling an electrical circuit according to the differential change in the dimensions of said elements, means for generating heat and conducting such heat to one of said members, and means supporting said such heated member in the path of fluid flow to which response is desired whereby the extent of temperature rise thereof affected by said heating means will depend on the velocity of the fluid motion 22. In a fluid-speed responsive switch, a metallic thermostatic element which expands when heated and contracts when cooled, a circuit for passing current directly through said thermostatic element, said thermostatic element being composed of material of such specific resistivity and being of such dimensions that the flow of said current directly therethrough will generate appreciable heat directly therein and raise the temperature of the same appreciably above ambient, means supporting said thermostatic element in the path of flow of fluid the velocity of which it is desired to have the switch respond, whereby the degree of rise of said thermal element will depend on the fluid velocity, and means adapted for connection to a circuit comprising means associated with said thermal element to affect control of such a circuit when the thermal element deflects in response to changes in fluid velocity.

23. In a device for controlling a fluid pump in response to changes in fluid motion at a predetermined location; the combination with such a fluid pump, of a motor for driving said pump; fluid-speed responsive means comprising thermostatic means connected to and controlling said motor, and heating means that heats said thermostatic means above ambient temperature; and means supporting said fluid-speed responsive means to so position a sufficient portion of the same in the path of flow of said fluid motion at said predetermined location that the fluid motion at said location will carry heat away from said fluid-speed responsive means in quantity depending on the velocity of said fluid motion at said location, whereby the extent of temperature rise above ambient attained by said thermostatic means depends to appreciable degree on the speed of fluid motion at said location.

WILLIAM D. HALL.